(12) United States Patent
Schimnowski et al.

(10) Patent No.: US 7,197,407 B2
(45) Date of Patent: Mar. 27, 2007

(54) FUEL TANK LEVEL MONITORING SYSTEM AND METHOD

(75) Inventors: Kenneth R. Schimnowski, Denison, TX (US); David E. Woollums, Frisco, TX (US); Jeffrey L. Cole, Allen, TX (US); Richard J. Vanderah, Marshalltown, IA (US)

(73) Assignee: Fisher Controls International LLC., St. Louis, MO (US)

( * ) Notice: Subject to any disclaimer, the term of this patent is extended or adjusted under 35 U.S.C. 154(b) by 39 days.

(21) Appl. No.: 10/743,212

(22) Filed: Dec. 22, 2003

(65) Prior Publication Data

US 2004/0204870 A1 Oct. 14, 2004

(51) Int. Cl.
*G01F 1/00* (2006.01)
*G01F 17/00* (2006.01)
(52) U.S. Cl. .............................. 702/45; 702/55; 73/861
(58) Field of Classification Search .................. 702/45, 702/46, 50, 55; 73/861, 861.01; 123/518, 123/522, 523
See application file for complete search history.

(56) References Cited

U.S. PATENT DOCUMENTS

| | | | |
|---|---|---|---|
| 3,766,779 A | 10/1973 | Hoffman | |
| 4,041,758 A | 8/1977 | Stenberg | |
| 4,297,899 A | 11/1981 | Blaney et al. | |
| 5,458,007 A | 10/1995 | Lake | |
| 5,642,097 A * | 6/1997 | Martel | 340/618 |
| 6,216,727 B1 | 4/2001 | Genova et al. | |
| 6,441,744 B1 | 8/2002 | Adams et al. | |
| 6,766,688 B2 * | 7/2004 | O'Shea | 73/319 |
| 6,964,821 B2 * | 11/2005 | Hirakata | 429/22 |

FOREIGN PATENT DOCUMENTS

| | | | |
|---|---|---|---|
| JP | 2000121408 A | * | 4/2000 |
| WO | WO-02/095336 | | 11/2002 |

OTHER PUBLICATIONS

International Search Report for International Patent Application No. PCT/US02/22081, dated Oct. 4, 2002, 6 pages.
"Industrial Flowmeter", Measurement Technologies, Jun. 2000.
International Search Report for International Patent Application No. PCT/US04/040056, dated Apr. 18, 2005, 6 pages.
Written Opinion for International Patent Application No. PCT/US04/040056, dated Apr. 18, 2005, 6 pages.
International preliminary Report on Patentability issued in PCT/US2004/40056 issued on June 26, 2006.

* cited by examiner

*Primary Examiner*—Bryan Bui
*Assistant Examiner*—Meagan S Walling
(74) *Attorney, Agent, or Firm*—Marshall, Gerstein & Borun LLP

(57) ABSTRACT

A method and system for monitoring a level of liquid fuel in a tank having a known capacity, wherein the tank fluidly communicates with a fuel supply line through which the fuel is delivered in gaseous form. The method comprises measuring a flow rate of gaseous fuel flowing through the supply line, calculating an expended fuel volume based on the measured flow rate, and determining a remaining liquid fuel level in the tank based on the expended fuel volume and tank capacity. A delivery of liquid fuel to the tank is prompted in response to the remaining liquid fuel level.

14 Claims, 3 Drawing Sheets

FUEL TANK LEVEL MONITORING SYSTEM AND METHOD

FIELD OF THE DISCLOSURE

This disclosure generally relates to fuel delivery systems and, more particularly, to systems for monitoring a remaining fuel level in a fuel supply tank.

BACKGROUND OF THE DISCLOSURE

In certain fuel delivery systems, such as a propane gas system, the consumers are supplied propane gas from a tank of liquefied propane. The tank is typically isolated from any established fuel pipelines, and therefore must be periodically refilled. A float level sensor is used in the propane tank to monitor the liquefied propane level. In such systems, the user periodically views the tank level sensor and then requests delivery of replacement propane as required. While such fuel level sensors which are mounted in the tank can provide a reliable indication of the liquefied propane level remaining in the tank, they are difficult to maintain and time-consuming to repair when needed in view of their placement within the tank itself.

It is therefore desired to provide a propane tank level monitoring system which can not only sense and display the level liquefied propane in the tank, but which can also provide a signal to a central location to use the information to track gas usage rate and to schedule delivery of replacement fuel as needed. In particular, it is desired to provide an in-line gas flow rate sensor for sensing the gas flow rate from which the level of the propane remaining in the tank can be derived.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
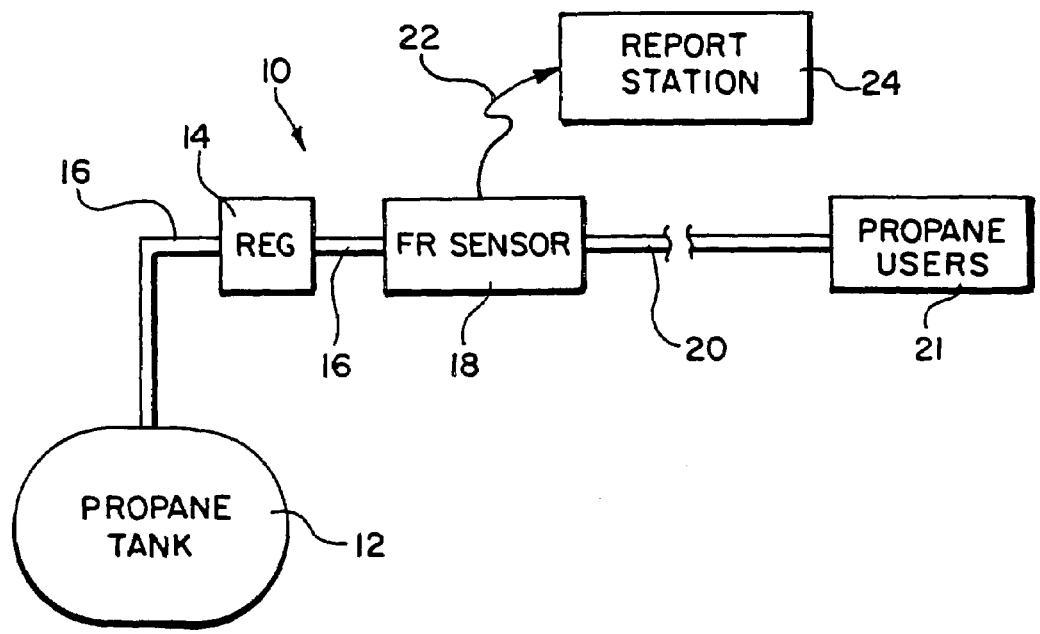
FIG. 1 is a schematic diagram of a propane gas tank distribution system incorporating an in-line flow rate sensor according to the present invention.

FIG. 1 illustrates a propane gas distribution system 10 which includes a tank 12 containing a supply of propane gas. A pressure regulator 14 regulates the gas pressure in a supply conduit 16 which is coupled to an in-line flow rate sensor 18. The gas flow output of the flow rate sensor 18 is coupled on an outlet conduit 20 to users 21 of the propane gas. The gas flow rate sensor 18 includes a communication link to provide a signal on output line 22 representing the gas flow rate which signal is coupled to a report station 24. The report station 24 uses the gas flow rate information to determine the level of propane remaining within the propane tank 12 and can then schedule delivery of replacement gas to the tank 12 as needed.

Figure 2:
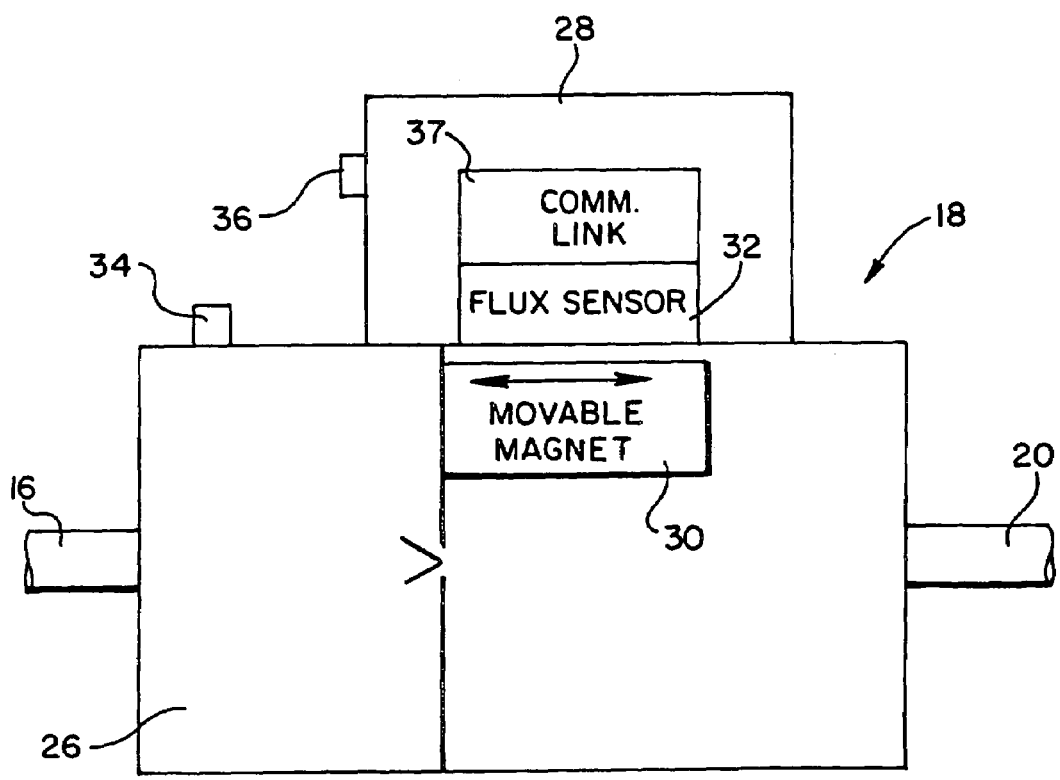
FIG. 2 is a schematic diagram illustrating an in-line flow rate sensor according to the present invention including an in-line flow tube.

FIG. 2 schematically illustrates the in-line gas flow rate sensor 18 in accordance with the present invention which includes a flow tube 26 and an auxiliary housing 28 mounted on the flow tube 26. A movable magnet 30 is mounted within the flow tube 26 and acted upon by the gas flow from conduit 16 to provide a changing flux density in response to the changing gas flow rate. A magnetic sensor 32, such as a Hall effect sensor, is mounted in the auxiliary housing 28 and closely adjacent the magnet 30 so as to detect the changing flux density corresponding to the changing gas flow rate. A pressure sensor 34 is mounted in the flow tube to detect the pressure of the gas inlet from inlet conduit 16. A temperature sensor 36 is mounted in the auxiliary housing 28 to detect the gas temperature. The respective outputs of the magnetic sensor 32, pressure sensor 34 and temperature sensor 36 are coupled to a communications link 37 for supplying the corresponding information on output line 22 to the report station 24. With this information the gas flow rate can be obtained using a well known algorithm, such as the Universal Gas Sizing Equation, and the level of gas remaining in the tank 12 also can be readily obtained.

Figure 3:
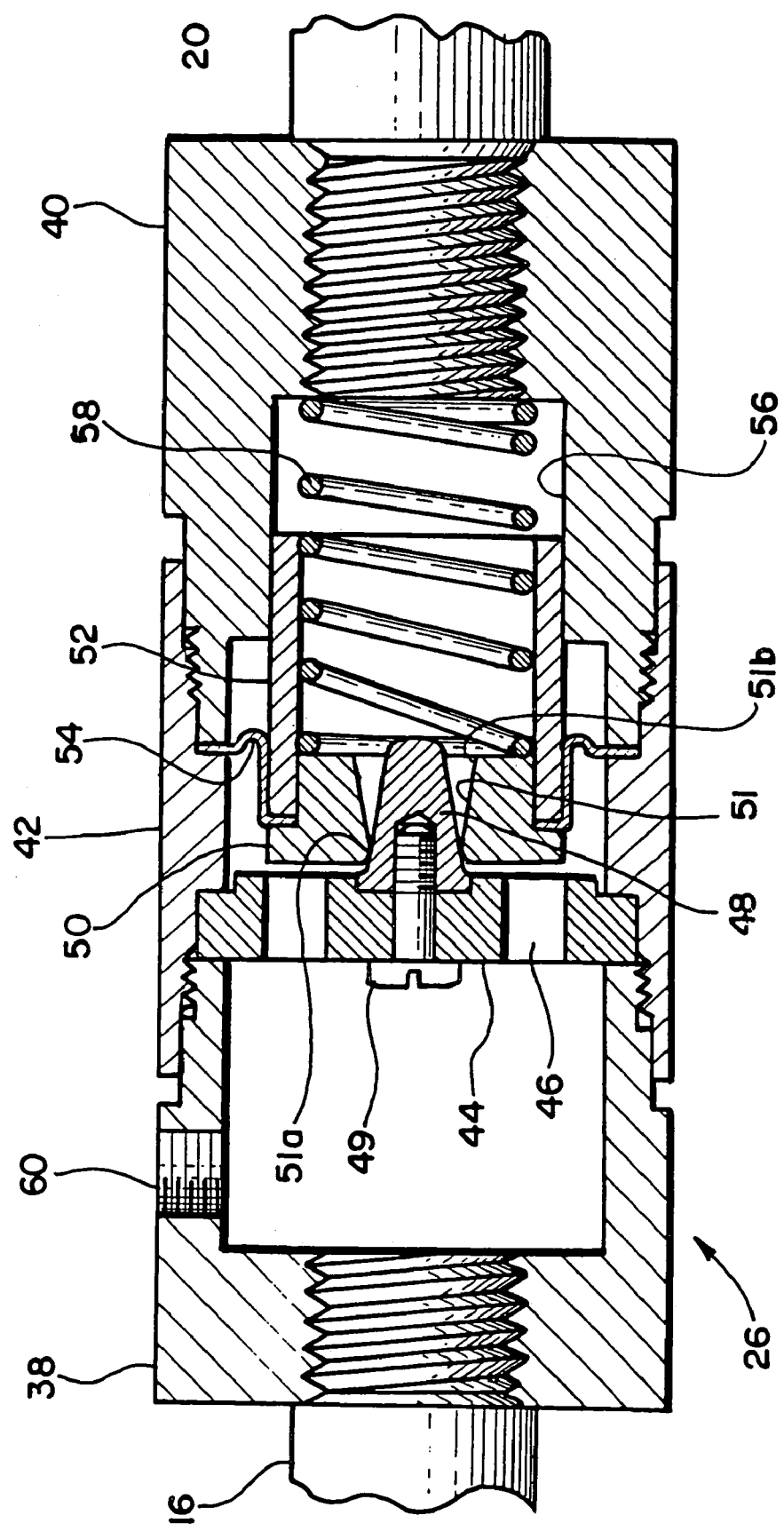
FIG. 3 is a cross sectional view illustrating a gas flow rate sensor in accordance with the present invention.

The details of the schematic view FIG. 2 of the flow rate sensor 18 are shown in the cross sectional view of FIG. 3. As shown in the cross-sectional view of FIG. 3, the flow tube 26 includes an inlet tube 38 and an outlet tube 40 which are threadably joined together by an orifice guide 42. The inlet tube 38, the outlet tube 40, and the orifice guide 42 are all formed of a non-magnetic metal such as brass or aluminum. A flow plate 44 is formed of a plastic material and includes a series of flow holes 46 to evenly distribute the inlet gas flow from inlet conduit 16. A tapered plug 48 is mounted to the flow plate 44 by a threaded screw 49.

A movable orifice member 50 includes a central opening 51 surrounding the tapered plug 48 with an upstream opening 51a being smaller than a downstream opening 51b so that the central opening 51 is outwardly diverging. As shown in FIG. 3 there is an increasing space between the tapered plug 48 and the central opening 51 in the downstream flow direction.

A magnet member 52 is mounted to the orifice member 50 with a flexible diaphragm 54 having its inner perimeter inserted therebetween, and with the outer perimeter of the diaphragm mounted between the outlet tube 40 and the orifice guide 42. The magnet member 52 is slidably mounted within a cavity 56 provided in the outlet tube 40, so that with changing gas flow rates, the plug holder 50 and attached magnet member 52 slidably move within the cavity 56. A spring 58 is captured between the outlet tube 40 and the orifice member 50 and has sufficient resiliency to move the upstream opening 51a of the orifice member 50 to one end of the plug 48 as shown in FIG. 3 when there is no gas flow. As the gas flow rate is increased, the orifice member 50 and associated magnet member 52 is moved away from the closed position and eventually to a position with respect to the plug 48 representing a maximum gas flow rate position.

The tapered plug 48 and the outwardly diverging central aperture are shaped so that there is a direct linear relationship provided between the change in the flow orifice (i.e., the space between the tapered plug 48 and the central opening 51) and the flow rate change. In other words, with the flow orifice closed as shown in FIG. 3, and going to a fully opened flow orifice position which represents the maximum gas flow rate position, the shape of plug 48 and the shape of the central opening 51 provides a linear relationship between the change in the magnetic flux density created by the movement of magnet 52 and the output from the magnetic sensor 32. Thus, plug 48 and central opening 51 may be termed an "equal percent plug" which provides an equal percent flow orifice, i.e., with each uniform increment of orifice member 50 there is provided a constant percent of flow change through the flow orifice. Thus, a linear relationship exists between the magnetic flux density and the output of the magnetic sensor 32 in response to a changing flow rate through the flow orifice.

In a constructed prototype embodiment of the invention the central aperture was formed outwardly diverging at an angle of about 10 degrees, and the tapered plug was formed inwardly converging at an angle of about 6 degrees.

A mounting port 60 in the inlet tube 38 enables mounting of the pressure sensor 34. Utilizing the output of the magnetic sensor 32, as well as the information from the pressure sensor 34 and the temperature sensor 36 enables the gas flow rate to be determined using an algorithm well known in the industry. Once the gas flow rate has been determined, the amount of gas remaining within propane tank 12 can readily be determined, and delivery of any replacement fuel can be scheduled as required.

Figure 4:
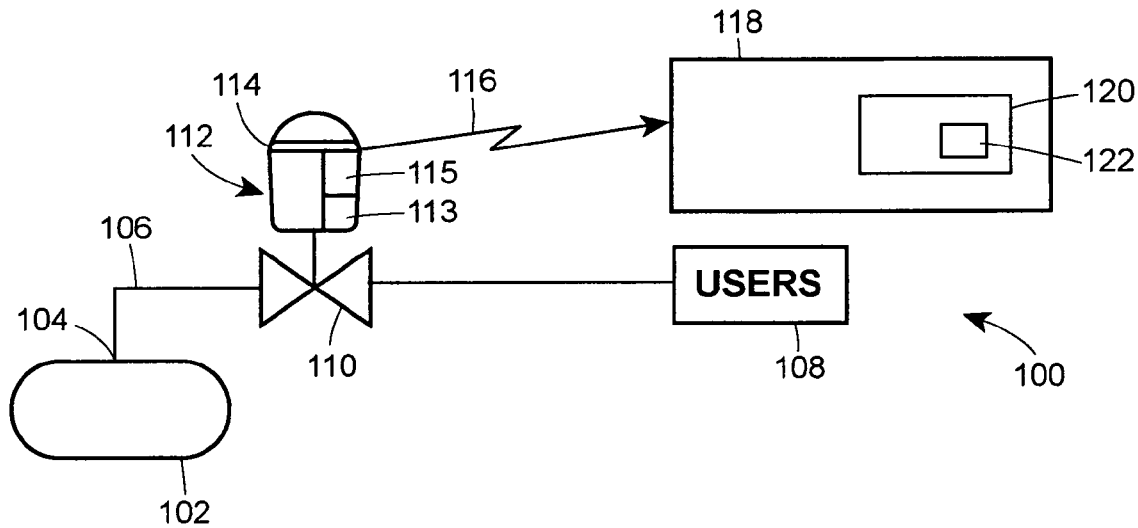
FIG. 4 is a schematic diagram of an alternative gas fuel distribution system.

With reference to FIG. 4, an alternative fuel supply system 100 is shown having a tank 102 for holding fuel, such as liquefied propane. The tank 102 may be positioned at a remote location or may otherwise be isolated from access to an established fuel pipeline. Consequently, the tank 102 must be periodically refilled with fuel from a distribution center. The tank 102 includes an outlet 104 connected to a supply line 106 for delivering gas fuel to one or more users 108, and a pressure regulator 110 regulates the gas pressure in the supply line 106.

A flow rate sensor, such as flow measurement module 112, is provided for sensing gas fuel flow and generating an output providing fuel flow information. In the illustrated embodiment, the regulator 110 and flow measurement module 112 are integrated to provide an intelligent pressure regulator, as disclosed in commonly owned U.S. Pat. Nos. 6,178,997 and 6,539,315, the disclosures of which are incorporated herein by reference. In the alternative, the regulator 110 and flow rate sensor may be provided as separate components. The flow measurement module 112 includes a processor 113, a memory 115, and a communication link 114 for providing a signal on an output line 116.

A report station 118, which may be positioned remote from the flow measurement module 112 such as at a fuel distribution center, is communicatively coupled to the communication link 114 via the output line 116. The report station 118 may include a controller 120 having a memory 122. The report station 118 receives the fuel flow information and schedules delivery of replacement gas to the tank 102 as needed.

In operation, the propane is stored in the tank 102 as a liquid. The tank may require pressurization to maintain the propane in the liquid state. As the regulator 110 opens, propane exits the tank in gaseous form to travel through the supply line 106. As the propane gas passes through the supply line 106, the flow sensor measures process variables that may be used to calculate gas flow rate. Downstream of the regulator 110 and flow sensor, the gas fuel flows through the supply line 106 to the end user 108.

Figure 5:
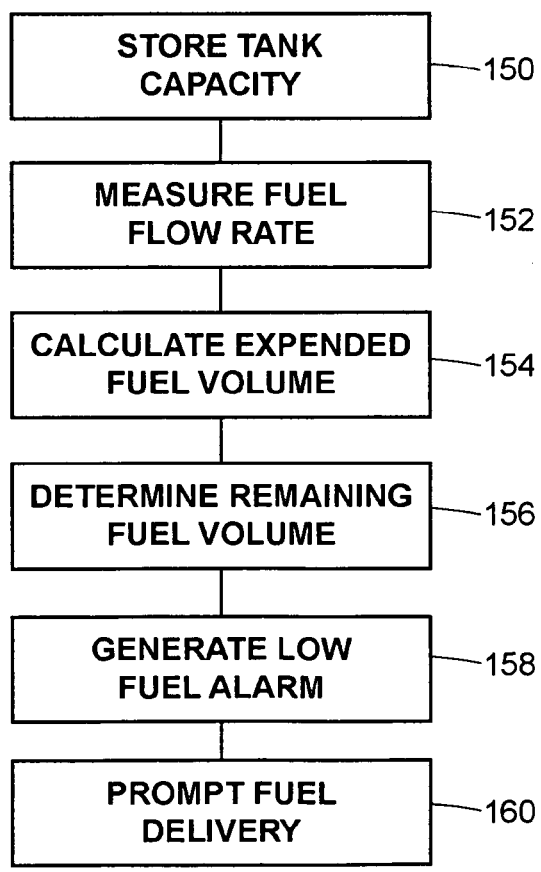
FIG. 5 is a flow chart illustrating steps for measuring gas fuel flow rate and scheduling delivery of additional gas fuel to the tank.

FIG. 5 is a flow chart of a method for monitoring the level of fuel in the tank and scheduling delivery of additional fuel to the tank that may be executed by the fuel distribution system 100. At block 150, a tank capacity is stored in memory. Where the flow rate sensor includes a processor and memory, such as with the flow measurement module 112, the tank capacity may be stored in either the flow measurement module memory 115 or the report station controller memory 122, or both.

At block 152, the rate of gas fuel flow through the supply line 106 is measured. As noted above, the flow rate may be obtained using any known method or device. Where the flow measurement module 112 is used, the flow rate is inferred using a standard flow equation and measured process parameters such as upstream and downstream fluid pressure and throttling element position. Alternatively, the report station controller 120 may be programmed with the flow equation, and the flow measurement module 112 may simply forward the measured parameters to the controller 120. Based on the measured flow rate, an expended volume of fuel is calculated at block 154. Again, the expended volume may be calculated by the flow measurement module 112 or by the report station controller 120.

At block 156, the remaining fuel level in the tank is determined. The remaining fuel level may be calculated by subtracting the expended fuel volume from the stored tank capacity. To calculate the remaining fuel level, the expended fuel volume may first be converted from a gas volume to a liquid volume to determine the remaining liquid volume of propane in the tank 102. Alternatively, the liquid volume capacity may be converted to a gas volume capacity, and the expended fuel volume may be subtracted from the gas volume capacity of the tank 102.

Based on the remaining fuel level, a low fuel alarm may be generated at block 158. The low fuel alarm may be generated when the remaining fuel level corresponds to a user-entered low level limit. Once again, the steps described in block 156 and 158 may be performed by either the report station 118 or the flow sensor. Finally, the report station 118 may schedule a delivery of additional fuel to the tank at block 160. The new delivery may be scheduled in response to the low fuel alarm, and will typically be prompted by the report station controller 120.

It will be appreciated that various devices may be employed as the flow rate sensor, each of which may generate different fuel flow information. The flow rate sensor may simply detect upstream fluid pressure, downstream fluid pressure, and regulator throttling element position. These measured variables may then be forwarded to the report station 118, which may be programmed to calculate flow rate based on the variables. Alternatively, the flow sensor may sense the process variables and calculate the fuel flow rate, which is then forwarded to the report station 118. In response, the report station 118 may calculate a total volume of expended gas fuel and a remaining fuel level in the tank. Still further, where the flow rate sensor includes a microprocessor, such as with the flow measurement module 112, it may execute each of the calculations noted above and forward only the low fuel level alarm to the report station 118. Alternatively, the flow rate sensor may calculate fuel flow and the expended fuel volume and forward the expended fuel volume to the report station 118. The report station may include a memory having the tank volume capacity and low fuel level stored thereon, and therefore may calculate the remaining tank volume and generate a low fuel alarm as appropriate.

In addition to generating flow rate information for determining the remaining fuel level in the tank, the flow sensor may forward additional information to the report station 118 for other diagnostic purposes. For example, the flow sensor may include a memory for storing high and low pressure limits, logic based alarm conditions, or other process control parameters that may indicate faulty system equipment or abnormal operating conditions, such as those disclosed in commonly owned U.S. Pat. No. 6,441,744, which is incorporated herein by reference. The flow measurement module 112 may generate alarms based on these parameters and forward the alarms to the report station 118, which may respond by scheduling a maintenance visit for the gas fuel system.

The foregoing detailed description has been given for clearness of understanding only, and no unnecessary limitations should be understood therefrom, as modifications will be obvious to those skilled in the art.

What is claimed is:

1. A fuel tank system for storing a fuel in a liquid state and delivering the fuel in a gaseous state, the system comprising:
   a tank having a known liquid capacity;
   a supply line in fluid communication with the tank;
   a regulator disposed in the supply line;
   a flow sensor associated with the supply line adapted to generate fuel flow information, the flow sensor including a communication link for communicating the fuel flow information and comprising flow measurement module integrally provided with the regulator, wherein the flow measurement module includes a processor and a memory such that the flow measurement module processor is programmed to calculate an expended fuel volume based on the fuel flow rate; and
   a report station communicatively coupled to the flow sensor by the communication link to receive the fuel flow information, the report station including a controller having a memory programmed to schedule a delivery of fuel in response to the fuel flow information.

2. The fuel tank system of claim 1, in which the tank capacity is stored in the flow measurement module memory, and in which the flow measurement module processor is programmed to calculate a remaining level of fuel in the tank based on the expended fuel volume and tank capacity.

3. The fuel tank system of claim 2, in which the remaining level of fuel in the tank is communicated to the report station and the report station memory includes a low fuel limit, wherein the report station controller is programmed to generate a low fuel alarm when the remaining level of fuel in the tank corresponds to the low fuel limit.

4. The fuel tank system of claim 3, in which the report station controller is programmed to schedule a delivery of fuel to the tank in response to the low fuel alarm.

5. The fuel tank system of claim 1, in which the tank capacity is stored in the report station memory and the expended fuel volume is communicated to the report station, wherein the report station controller is programmed to calculate a remaining level of fuel in the tank based on the expended fuel volume and tank capacity.

6. The fuel tank system of claim 5, in which the report station memory includes a low fuel limit, and in which the report station controller is programmed to generate a low fuel alarm when the remaining level of fuel in the tank corresponds to the low fuel limit.

7. The fuel tank system of claim 6, in which the report station controller is programmed to schedule a delivery of fuel to the tank in response to the low fuel alarm.

8. The fuel tank system of claim 7, in which the tank capacity is stored as a liquid volume and in which the report station controller receives the expended fuel volume as a gaseous fuel volume and is programmed to convert the gaseous fuel volume into a liquid fuel volume before calculating the remaining level of fuel in the tank.

9. A method of monitoring a level of liquid fuel in a tank having a known capacity, wherein the tank fluidly communicates with a fuel supply line through which the fuel is delivered in gaseous form, the method comprising:
   measuring a flow rate of gaseous fuel flowing through the supply line;
   calculating an expended fuel volume based on the measured flow rate;
   determining a remaining liquid fuel level in the tank based on the expended fuel volume and tank capacity;
   prompting a delivery of liquid fuel to the tank in response to the remaining liquid fuel level;
   generating a low fuel alarm when the remaining liquid fuel level in the tank corresponds to a low fuel level such that the delivery of liquid fuel to the tank is prompted in response to the low fuel alarm, wherein a report station controller generates the low fuel alarm when the remaining liquid fuel level in the tank corresponds to the low level limit.

10. A method of monitoring a level of liquid fuel in a tank having a known capacity, wherein the tank fluidly communicates with a fuel supply line through which the fuel is delivered in gaseous form, the method comprising:
    measuring a flow rate of gaseous fuel flowing through the supply line;
    calculating an expended fuel volume based on the measured flow rate;
    determining a remaining liquid fuel level in the tank based on the expended fuel volume and tank capacity; and
    prompting a delivery of liquid fuel to the tank in response to the remaining liquid fuel level wherein a regulator is disposed in the supply line, further including a flow measurement module having a processor and a memory for measuring the flow rate of fuel flowing through the supply line such that the flow measurement module calculates the expended fuel volume based on the flow rate of gaseous fuel such that the flow measurement module determines the remaining liquid fuel level in the tank based on the expended fuel volume and the tank capacity wherein the tank capacity comprises a liquid tank capacity and the expended fuel volume is calculated as a gaseous expended fuel volume, the method further comprising converting the gaseous expended fuel volume to a liquid expended fuel volume before determining the remaining liquid fuel level in the tank.

11. A method of monitoring a level of liquid fuel in a tank having a known capacity, wherein the tank fluidly communicates with a fuel supply line through which the fuel is delivered in gaseous form, the method comprising:
    measuring a flow rate of gaseous fuel flowing through the supply line;
    calculating an expended fuel volume based on the measured flow rate;
    determining a remaining liquid fuel level in the tank based on the expended fuel volume and tank capacity; and
    prompting a delivery of liquid fuel to the tank in response to the remaining liquid fuel level wherein a regulator is disposed in the supply line, further including a flow measurement module having a processor and a memory for measuring the flow rate of fuel flowing through the supply line such that the flow measurement module calculates the expended fuel volume based on the flow rate of gaseous fuel such that the flow measurement module determines the remaining liquid fuel level in the tank based on the expended fuel volume and the tank capacity, the flow measurement module including a communication link, and in which a report station controller is communicatively coupled to the flow measurement module by the communication link.

12. The method of claim 11, in which the flow measurement module is provided integrally with the regulator.

13. The method of claim 11, in which the flow measurement module communicates the remaining liquid fuel level in the tank to the report station controller.

14. The method of claim 11, further comprising generating a low fuel alarm when the remaining liquid fuel level in the tank corresponds to a low fuel level, wherein the delivery of liquid fuel to the tank is prompted in response to the low fuel alarm.

* * * * *

UNITED STATES PATENT AND TRADEMARK OFFICE
CERTIFICATE OF CORRECTION

| | |
|---|---|
| PATENT NO. | : 7,197,407 B2 |
| APPLICATION NO. | : 10/743212 |
| DATED | : March 27, 2007 |
| INVENTOR(S) | : Kenneth R. Schimnowski et al. |

It is certified that error appears in the above-identified patent and that said Letters Patent is hereby corrected as shown below:

On the First Page:

At field (73), "LLC." should be -- LLC --.

At field (63), and column 1, line 3 add -- Continuation-in-part of application No. 09/776,428, filed Feb. 2, 2001. --.

In the Specification:

At Column 2, line 26, "view FIG. 2" should be -- view in FIG. 2 --.

Signed and Sealed this

Fourteenth Day of August, 2007

JON W. DUDAS
*Director of the United States Patent and Trademark Office*